(12) United States Patent
Burris et al.

(10) Patent No.: US 11,948,187 B2
(45) Date of Patent: *Apr. 2, 2024

(54) ARTIFICIAL INTELLIGENCE BASED DIGITAL LEASING ASSISTANT

(71) Applicant: Dynasty Marketplace, Inc., Goleta, CA (US)

(72) Inventors: Elliott Burris, Venice, CA (US); Daniel Posch, Venice, CA (US); Kyle Triplett, Westlake Village, CA (US); David Ma, Venice, CA (US); Robert Ryan, Venice, CA (US); John Rothfels, Venice, CA (US)

(73) Assignee: APPFOLIO, INC., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,055

(22) Filed: Mar. 22, 2023

(65) Prior Publication Data
US 2023/0230182 A1 Jul. 20, 2023

Related U.S. Application Data

(63) Continuation of application No. 16/527,451, filed on Jul. 31, 2019, now Pat. No. 11,615,463.
(Continued)

(51) Int. Cl.
*G06Q 30/02* (2023.01)
*G06N 3/02* (2006.01)
(Continued)

(52) U.S. Cl.
CPC .......... *G06Q 30/0645* (2013.01); *G06N 3/02* (2013.01); *G06N 3/0464* (2023.01); *G06N 3/08* (2013.01);
(Continued)

(58) Field of Classification Search
CPC .. G06Q 30/02; G06Q 30/0645; G06Q 10/107; G06Q 30/0242; G06Q 50/163;
(Continued)

(56) References Cited

U.S. PATENT DOCUMENTS

2015/0235332 A1* 8/2015 Styve ................. G06Q 30/0613
705/7.13
2018/0225434 A1* 8/2018 Sivakumar ............ G06F 16/955
(Continued)

FOREIGN PATENT DOCUMENTS

CA 2800102 A1 * 11/2011 ............. G06F 17/30
WO 2011146631 A2 11/2011
(Continued)

OTHER PUBLICATIONS

K. M. Annervaz; Jovin George; Shubhashis Sengupta, A Generic Platform to Automate Legal Knowledge Work Process Using machine Learning (English), 2015 IEEE 14th International Conference on Machine Learning and Applications (ICMLA) (pp. 396-401), 1-Dec. 2015 (Year: 2015).*
(Continued)

*Primary Examiner* — Marilyn G Macasiano
(74) *Attorney, Agent, or Firm* — Lowenstein Sandler LLP

(57) ABSTRACT

A leasing AI platform receives a message pertaining to leasing a real estate unit, generates a token matrix representing at least a portion of the message, and provide the token matrix as an input to a trained machine learning model. An output of the trained machine learning model comprises an indication of a first category associated with the at least the portion of the message. The leasing AI platform identifies one or more actions associated with the first category, the actions pertaining to leasing the real estate
(Continued)

unit, and automatically executes the one or more actions without human involvement in response to receiving the message.

20 Claims, 11 Drawing Sheets

Related U.S. Application Data

(60) Provisional application No. 62/713,073, filed on Aug. 1, 2018.

(51) Int. Cl.
*G06N 3/0464* (2023.01)
*G06N 3/08* (2023.01)
*G06N 20/00* (2019.01)
*G06Q 10/107* (2023.01)
*G06Q 30/0242* (2023.01)
*G06Q 30/0645* (2023.01)
*G06Q 50/16* (2012.01)
*G06Q 50/163* (2024.01)

(52) U.S. Cl.
CPC .......... *G06N 20/00* (2019.01); *G06Q 10/107* (2013.01); *G06Q 30/0242* (2013.01); *G06Q 50/16* (2013.01); *G06Q 50/163* (2013.01)

(58) Field of Classification Search
CPC ............. G06Q 30/0254; G06Q 10/067; G06Q 30/0246; G06Q 30/0207; G06N 3/02; G06N 20/00; G06N 3/0445; G06N 20/10; G06N 3/0454; G06N 3/08
See application file for complete search history.

(56) References Cited

U.S. PATENT DOCUMENTS

2020/0184582 A1* 6/2020 Fox .................... G06Q 30/0201
2020/0211134 A1* 7/2020 Sahagen ................ G06Q 30/04
2020/0348992 A1* 11/2020 Kurabayashi ........... G06F 9/542

FOREIGN PATENT DOCUMENTS

WO   WO 2011/146631 A2 * 11/2011   ............. G06Q 50/00
WO       2017150772 A1     9/2017

OTHER PUBLICATIONS

Latifi, Sobhan et al., "Blockchain-Based Real Estate Market: One Method for Applying Blockchain Technology in commercial Real Estate Market" (English), 2019 IEEE International Conference on Blockchain (Blockchain) (pp. 528-535), Jan. 31, 2020 (Year: 2020).

Norta, Alex et al., "Commercial Property Tokenizing With Smart Contracts" (English), 2018 International Joint Conference on Neural Networks (IJCN N) (pp. 1-8), Jul. 1, 2018 (Year: 2018).

* cited by examiner

ARTIFICIAL INTELLIGENCE BASED DIGITAL LEASING ASSISTANT

RELATED APPLICATIONS

This application is a continuation of U.S. patent application Ser. No. 16/527,451, filed Jul. 31, 2019, and now issued as U.S. Pat. No. 11,615,463, which claims the benefit of U.S. Provisional Patent Application No. 62/713,073, filed Aug. 1, 2018, the entire contents of each of which are hereby incorporated by reference herein.

TECHNICAL FIELD

The present disclosure is generally related to computer systems, and is more specifically related to systems and methods for an artificial intelligence based digital leasing assistant.

BACKGROUND

Information extraction may involve analyzing a natural language text to recognize and classify information objects in accordance with a pre-defined set of categories (such as names of persons, organizations, locations, expressions of times, quantities, monetary values, etc.). Information extraction may further identify relationships between the recognized named entities and/or other information objects.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
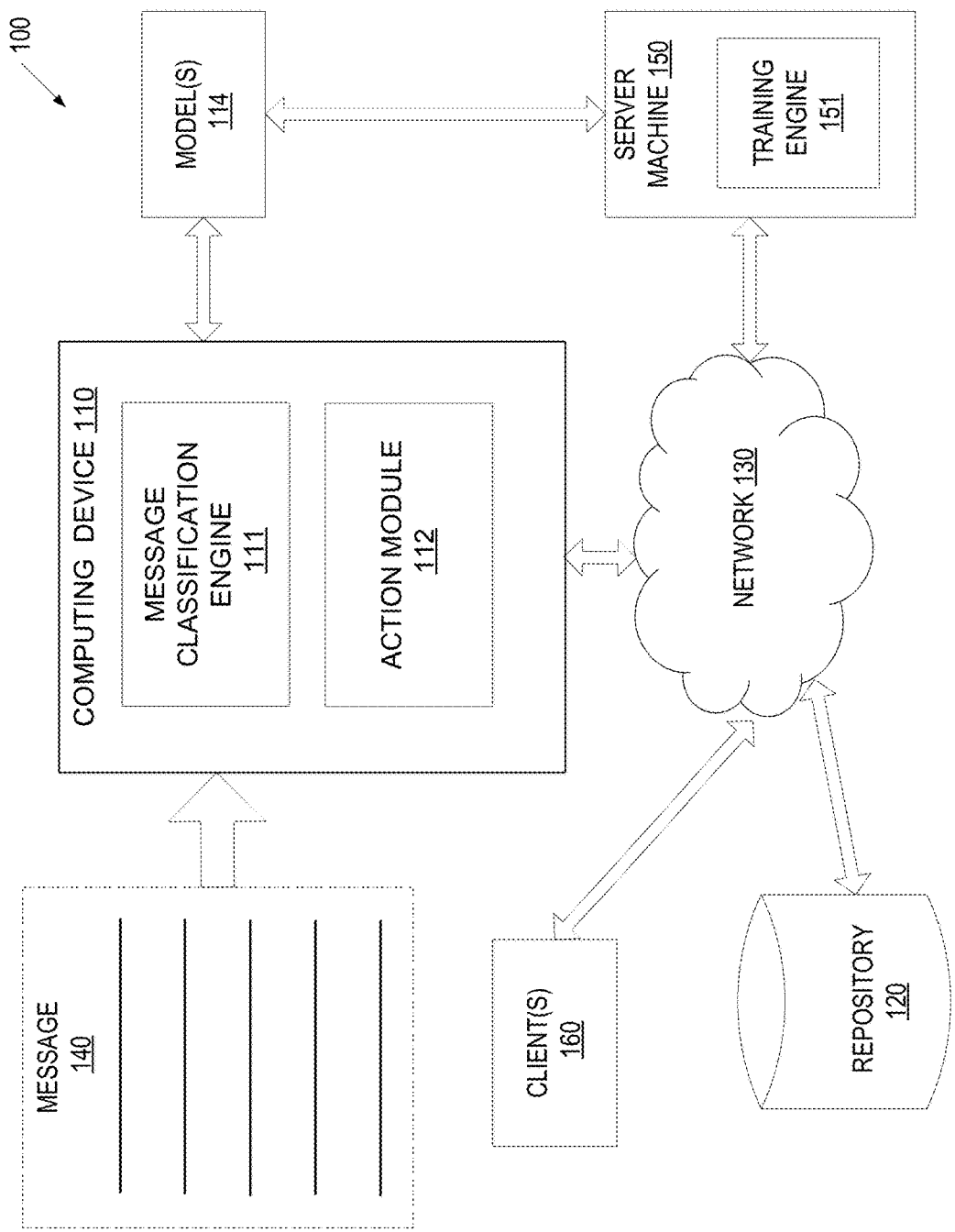
FIG. 1 depicts a high-level component diagram of an illustrative system architecture, in accordance with one or more aspects of the present disclosure.

Embodiments for an artificial intelligence based digital leasing assistant are described. Many real estate companies use conventional property management software to keep track of their buildings and tenants. Each real estate company employs staff that collects rent, handles tenant problems, maintenance requests, and the like. These companies are also responsible for "leasing," which is a real estate term for showing and selling/renting open apartments or homes to interested prospects. Conventional property management software typically provides a web-based interface for staff to record and share information. These software suites are a blank canvas as they rely on the human input of the company's staff to perform numerous activities. These manual activities can include, for example, generating and providing marketing information (e.g., description, photos, pricing), adding listings to online listing sources using the property management software, sending a confirmation email after a prospect sees a listing on the Internet and clicks a widget (e.g., "ask for showing") or calls the office, monitoring an email inbox and replying to prospects, verifying that a prospect can pay rent, and meet other applicable standards, answering questions from prospects about the property, scheduling showings, confirming the showings, and rescheduling the showings, as needed, providing the prospect with an application for a unit, cross-selling the prospect on a different unit, following up with (i.e., "reactivating") old prospects to see if they are now interested in available units, greeting the prospect upon arrival and physically showing the unit, etc.

In a typical real estate firm, the staff may ignore a significant portion of messages related to the prospects. In many cases, the volume of messages is too much for the staff to handle in a timely manner, except for perhaps a template autoreply. Thus, the staff's limited use of the software may result in the loss of a great percentage of sales or sale opportunities.

In addition, conventional software programs may not be adequately suited t handle the unique challenges of natural language processing in the context of real estate and leasing management. One algorithm for classifying messages is the heuristic approach. In the heuristic approach, a large number (e.g., hundreds) of messages, such as emails or text messages, for example, are taken and statistics are accumulated regarding what text (e.g., keywords) is used in a message of a certain category. For example, the heuristic approach tracks what word or words typically appear in a message asking about the availability of an apartment, asking about the price of an apartment, asking to schedule an appointment to view an apartment, etc. On the basis of these statistics, when processing a new message, it can be determined whether the contents of the message correspond to a particular category. The heuristic approach does not always work precisely, however, because messages from different prospects may use slightly different words, phrasing, syntax, etc., or may even use incorrect terminology, which can lead to the corresponding message being miscategorized.

Aspects of the present disclosure address the above and other deficiencies by implementing an Artificial Intelligence (AI) based digital leasing assistant (also referred to herein as "the leasing AI platform") to address the shortcomings in current property management software and message classification techniques. In some embodiments, the leasing AI platform implements a machine learning knowledge system that uses natural language processing to enhance source content structured around certain electronic communications directed to real-estate and leasing transactions. For example, the leasing AI platform may include processing logic having a plurality of software modules or programs executed on one or more computer platforms of a system that are interconnected by one or more networks, such as the Internet. The leasing AI platform acts as a primary system that automates the "leasing" process so that the staff of real estate companies (also referred to herein as "agents") no longer need to do administrative work by reading and replying to various types of electronic communication messages (e.g., text/SMS/email, etc.). Agents can just accept showing invites on their calendar (scheduled automatically by the leasing AI platform) and open the door when the prospect arrives. By quickly replying to all prospects, the techniques disclosed herein strongly increase the rate at which a property management company leases their units.

Examples of the functionality provided by the leasing AI platform described herein include reading all prospect electronic messages and replying promptly (e.g., within minutes), qualifying all prospects uniformly (e.g., based on income, criminal record, evictions, etc.), answering prospect questions within minutes, scheduling appointments, confirming appointments, and rescheduling appointments with prospects as appropriate, following up after a showing with a link to a rental application, automatically cross-selling any prospect on similar units, automatically reactivating old prospects, among others.

The leasing AI platform can effectively automate many leasing management functions as well. In some implementations, the leasing AI platform enforces standard hours and group showings, which other types of management systems otherwise struggle to implement. The leasing AI platform may also escalate negative feedback from prospects to managers over SMS or other electronic communication means so that the company can learn which agents are creating issues at showings. Periodically (e.g., every morning) the leasing AI platform may brief the entire team of agents on their schedule, and every evening apprise the team of their customers' feedback. Thus, when managers learn about what has been happening every day at the property (e.g., missing staff, slow work pace, crime reports, etc.) they can respond accordingly.

In order to provide the above functionality, in one implementation, the leasing AI platform receives incoming messages from prospects, tenants, or other individuals and classifies the message into one or more of any number of defined categories describing the contents of the message. In one embodiment, the leasing AI platform can estimate a confidence value of the category to indicate how likely it is that category chosen for the message is correct. As a result of such an assessment, the platform can provide a client with not only the results of the classification, but also an indication of the confidence in the results.

Embodiments of the present disclosure make such an assessment by using a set of machine learning models (e.g., neural networks) to effectively classify the incoming message. The set of machine learning models may be trained on a body of messages that form a training data set. The training data set includes examples of messages as a training input and one or more categories that correctly correspond to the messages as a target output. Once trained, the set of machine learning models may be used for classification of new incoming messages. The use of machine learning models (e.g. convolutional neural networks) prevents the need for manual categorization of messages, as the manual work is replaced by machine learning. The techniques described herein allow for a simple network topology, and the network is quickly trained on a relatively small dataset. In addition, the method is easily applied to multiple use cases and the network can be trained using messages directed to one organization (e.g., real estate company, leasing agent, property manager), and then applied to messages directed to another organization with high quality results. Furthermore, using a convolutional network makes it possible to significantly reduce the number of errors in classification of such messages.

Once an incoming messages is classified, the leasing AI system can identify one or more actions, or a sequence of actions to be taken in response to the message. The actions can be specifically tailored to the category of the message and can be automatically executed by the leasing AI system. For example, if an incoming message is categorized as a request to come in an look at a particular unit, the leasing AI system can automatically verify that the prospect is eligible to rent the unit, schedule the showing at an appropriate time, and send invitations to both the prospect and a leasing agent. In other situations, the leasing AI system may perform a different sequence of one more actions based on the category of the incoming message, as will be described in more detail herein.

FIG. 1 depicts a high-level component diagram of an illustrative system architecture 100, in accordance with one or more aspects of the present disclosure. System architecture 100 includes a computing device 110, a repository 120, a server machine 150, and one or client devices 160 connected to a network 130. Network 130 may be a public network (e.g., the Internet), a private network (e.g., a local area network (LAN) or wide area network (WAN)), or a combination thereof.

Together, the computing device 110, repository 120, and server machine 150, including message classification engine 111, action module 112, models 114, and training engine 151, may implement a leasing AI platform that uses artificial intelligence to effectively categorize an incoming message 140 (e.g., received from a client device 160, identify appropriate actions to take in view of the category/classification of the incoming message, and automatically execute those actions. Depending on the embodiment, computing device 110 and client device 160 may each include a desktop computer, a laptop computer, a smartphone, a tablet computer, a server, a scanner, or any suitable computing device capable of performing the techniques described herein. Depending on the embodiment, computing device 110 and client device 160 may each include a different one of the above listed examples. The message 140 may be received by the computing device 110 and may include text (e.g., a sequence of words or phrases) forming a question, query, instruction, command, task, etc.

The message 140 may be received in any suitable manner. For example, the computing device 110 may receive a digital copy of the message 140 via network 130. In instances where the computing device 110 is a server, client device 160 connected to the server via the network 130 may send the message 140 to the server. In other instances, computing device 110 may receive the message 140 directly from client device 160 via a direct connection bypassing network 130. It should be noted that the message 140 may include for example, an email message, an instant message, a text message, an SMS message, or any other type of message. The message 140 may be used to train a set of machine learning models or may be a new message for which classification is desired. Accordingly, in the preliminary stages of processing, the message 140 can be prepared for training the set of machine learning models or subsequent identification.

In one embodiment, computing device 110 may include a message classification engine 111 and an action module 112. The message classification engine 111 and the action module 112 may each include instructions stored on one or more tangible, machine-readable storage media of the computing device 110 and executable by one or more processing devices of the computing device 110.

In one embodiment, the message classification engine 111 may use a set of trained machine learning models 114 that are trained and used to classify/categorize the message 140. The message classification engine 111 may also preprocess any received message, such as message 140, prior to using the message for training of the set of machine learning models 114 and/or applying the set of trained machine learning models 114 to the messages. In some instances, the set of trained machine learning models 114 may be part of the message classification engine 111 or may be accessed on another machine (e.g., server machine 150) by the message classification engine 111. Based on the output of the set of trained machine learning models 114, the message classification engine 111 may obtain a classification and/or category of the message 140, as well an assessment of the classification.

Server machine 150 may be a rackmount server, a router computer, a personal computer, a portable digital assistant, a mobile phone, a laptop computer, a tablet computer, a netbook, a desktop computer, or any combination of the above. The server machine 150 may include a training engine 151. The set of machine learning models 114 may refer to model artifacts that are created by the training engine 151 using the training data that includes training inputs and corresponding target outputs (i.e., correct answers for respective training inputs). During training, patterns in the training data that map the training input to the target output (i.e., the answer to be predicted) can be found, and are subsequently used by the machine learning models 114 for future predictions. As described in more detail below, the set of machine learning models 114 may be composed of, e.g., a single level of linear or non-linear operations (e.g., a support vector machine [SVM]) or may be a deep network, i.e., a machine learning model that is composed of multiple levels of non-linear operations). Examples of deep networks are neural networks including convolutional neural networks, recurrent neural networks with one or more hidden layers, and fully connected neural networks.

Convolutional neural networks include architectures that may provide efficient text field identification. Convolutional neural networks may include several convolutional layers and subsampling layers that apply filters to portions of the document image to detect certain features. That is, a convolutional neural network includes a convolution operation, which multiplies portions of the message by filters (e.g., matrices), element-by-element, and sums the results in a similar position in an output.

As noted above, the set of machine learning models 114 may be trained to determine the category of the message 140 using training data, as further described below. Once the set of machine learning models 114 are trained, the set of machine learning models 114 can be provided to message classification engine 111 for analysis of new messages. For example, the message classification engine 111 may input the message 140 being analyzed into the set of machine learning models 114. The message classification engine 111 may obtain one or more outputs from the set of trained machine learning models 114. The output may include an assessment of one or more categories to which the message 140 belongs as well as an indication of a strength of such an assessment.

The repository 120 is a persistent storage that is capable of storing messages 140 as well as data structures to tag, organize, and index the messages 140. Repository 120 may be hosted by one or more storage devices, such as main memory, magnetic or optical storage based disks, tapes or hard drives, NAS, SAN, and so forth. Although depicted as separate from the computing device 110, in an implementation, the repository 120 may be part of the computing device 110. In some implementations, repository 120 may be a network-attached file server, while in other embodiments, repository 120 may be some other type of persistent storage such as an object-oriented database, a relational database, and so forth, that may be hosted by a server machine or one or more different machines coupled to the network 130.

Once message classification engine 111 determines a category corresponding to the message 140, action module 112 may generate appropriate responses or follow-ups to the message 140 based on the category, for example, to automatically facilitate the "leasing" process for the system. For example, action module 112 may automatically generate and send a response to a question posed in the message 140, schedule an appointment, provide additional information, suggest an alternative unit to the sender of the message, or any other appropriate action.

Figure 2:
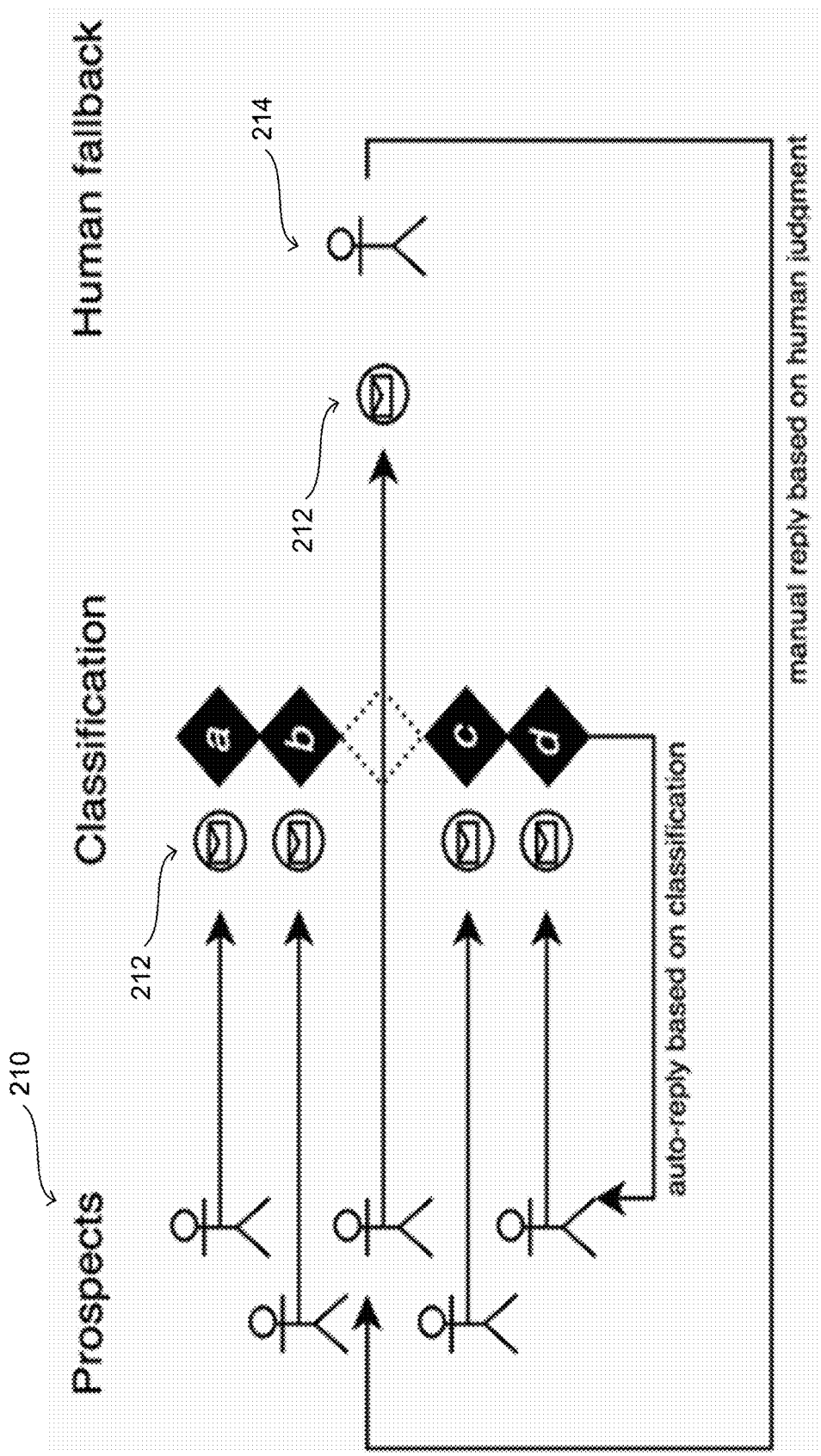
FIG. 2 illustrates how the leasing AI platform classifies incoming prospect messages in accordance with one or more aspects of the present disclosure.

In some implementations, the leasing AI platform is backed by human operators ("Operators") that may be distributed around the world using a proprietary interface ("Command Center") to access the leasing AI platform. FIG. 2 is an example of how the leasing AI platform classifies incoming prospect messages, for example, via one or more client devices 160. For example, prospects 210 looking for a unit to lease may send messages 212 including surprisingly similar questions, but with certain differences. Accordingly, message classification engine 111 may classify each of the messages 212 differently (i.e., as a classification a, b, c, and d). Examples of the possible classifications a, b, c, and d are shown below in Table 1.

TABLE 1

Message Classifications, a Partial List

| | |
|---|---|
| ASK_FOR_SHOW | Prospect is asking for a showing |
| RESPOND_WITH_UNIT_TYPE | Prospect clarified: 1 bedroom (br)/2br/3br etc. |
| ACCEPT_SHOW | Prospect accepts the showing on offer |
| YES_QUALIFY | Prospect passes tenant qualifications (income, etc.) |
| HUMAN_FALLBACK | Prospect's question matches no other classification |

Under certain circumstances, one of the messages 212, such as message 214 may not match any of the known classifications a, b, c, and d, as determined by message classification engine 111. For example, message classification engine 111 may determine that a confidence value associated with a certain category fails to satisfy a minimum confidence threshold (e.g., the confidence value is below the threshold). In these situations, the leasing AI platform may resort to a human fallback condition, where a manual reply as appropriate may be generated by one of the Operators 214. For example, when message classification engine 111 determines that none of the classifications a, b, c, and d apply with a minimum statistical confidence to message 212, the leasing AI platform may forward the message 212 to Operator 214 who can step in and take corrective action. For example, the Operator 214 may manually classify the message 212 and generate and send a manual reply to any questions posed in the message 212. This manual classification and response can be fed back to training engine 151 for use in future training operations of models 114. In this manner, the leasing AI platform learns from the actions taken by these Operators, resulting in new skills being added to the platform. In one implementation, the Operators provide around-the-clock coverage, ensuring that prospects are always given the highest level of service.

Figure 3:
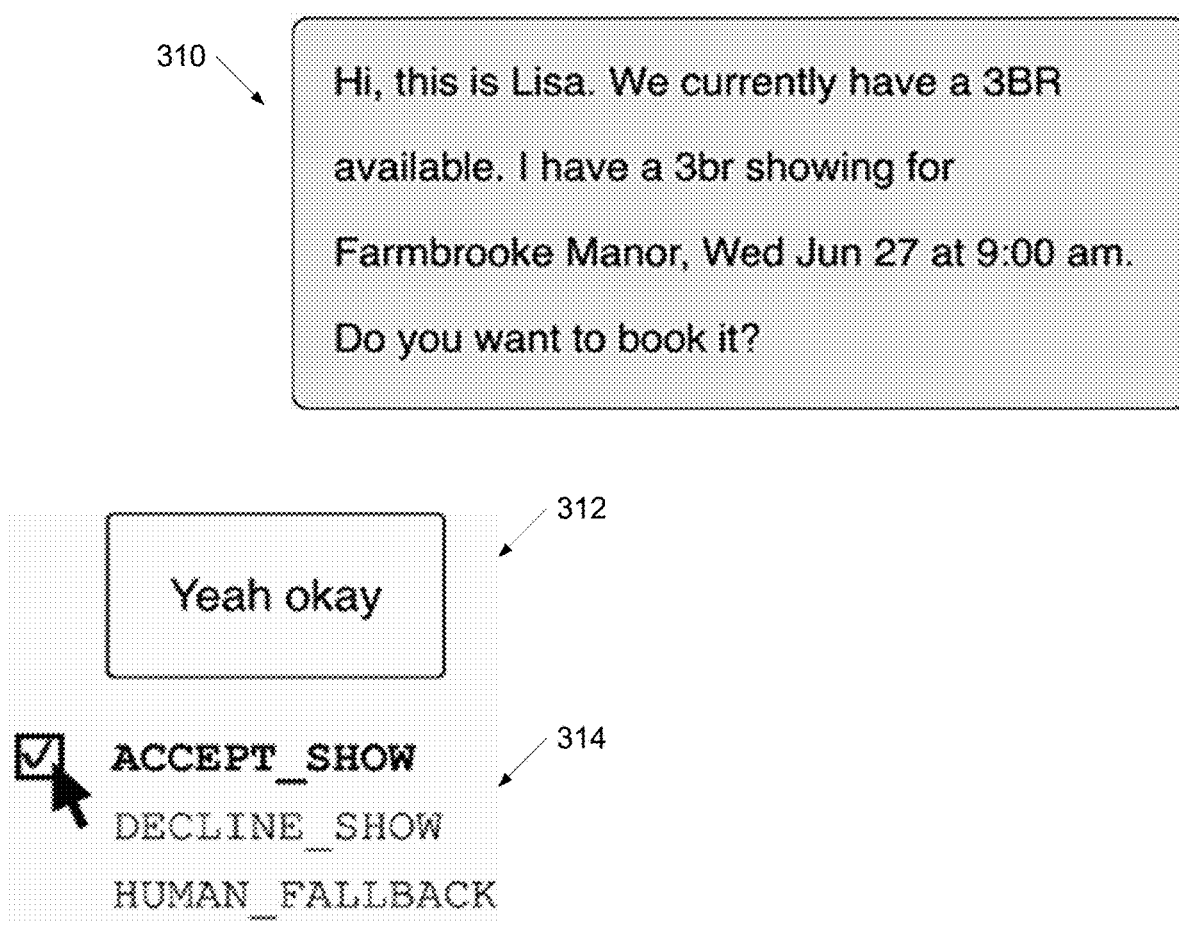
FIG. 3 illustrates an example interface for manual classification of incoming messages in accordance with one or more aspects of the present disclosure.

At inception, the leasing AI platform may have no training data, and so is unable to classify messages until the system is further utilized. In this regard, all prospect messages may be handled by Operators, who manually assign classifications to the messages. In this situation, or if the trained classifier is unable to determine an appropriate classification, the leasing AI platform may provide a user interface though which the Operators can select the appropriate classification. FIG. 3 illustrates an example interface for manual classification of incoming messages. In FIG. 3, action module 112 generates and sends a first message 310 to a prospect using client device 160. The first message 310 includes a proposed time for a showing of a particular unit and a question of whether the prospect would like to accept the showing. In response, the leasing AI platform receives a second message 312 from the prospect. If message classification engine 111 has not yet been sufficiently trained or is otherwise unable to determine an appropriate classification of the second message 312 with sufficient confidence, message classification engine 111 may forward the second message 312 to an Operator. The Operator may review the messages 310 and 312 and make a manual selection 314 of a category for the second message 312. In the illustrated embodiment, the manual selection 314 indicates that the second message 312 can be categorized as an acceptance of the showing (i.e., "ACCEPT_SHOW").

Figure 4:
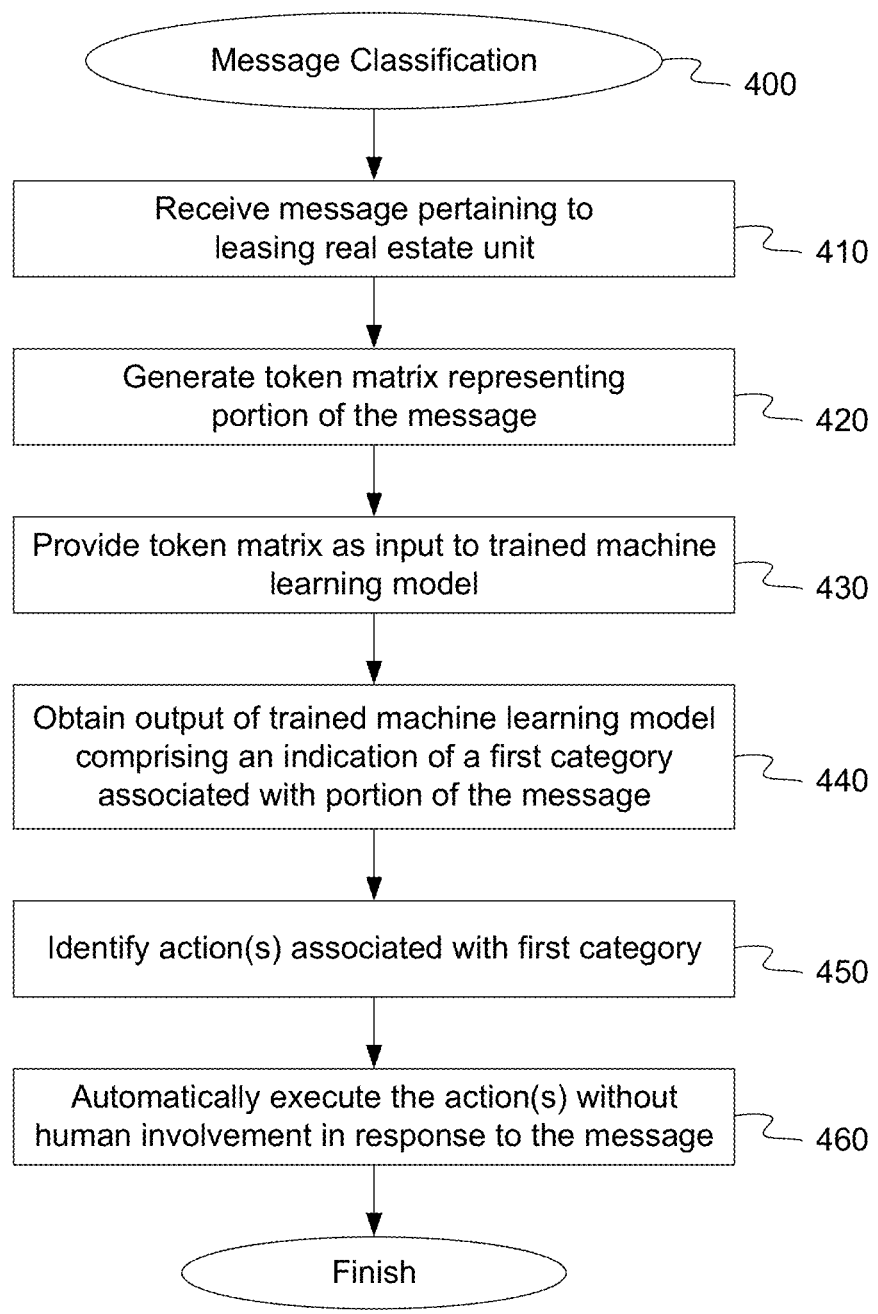
FIG. 4 is a flow diagram illustrating a message classification method, in accordance with one or more aspects of the present disclosure.

FIG. 4 is a flow diagram illustrating a message classification method, in accordance with one or more aspects of the present disclosure. The method 400 may be performed by processing logic that comprises hardware (e.g., circuitry, dedicated logic, programmable logic, microcode, etc.), software (e.g., instructions run on a processor to perform hardware simulation), firmware, or a combination thereof. In one embodiment, method 400 may be performed by computing device 110 including message classification engine 111 and action module 112, as shown in FIG. 1.

Referring to FIG. 4, at block 410, method 400 receives a message, such as message 140, pertaining to leasing a real estate unit. In one embodiment, the message 140 includes at least one of an email message or a text message received from a client device, such as client device 160, associated with a prospect interested in leasing the real estate unit. In one embodiment, the message 140 comprises a request for information about the real estate unit, a request to schedule a time to view the real estate unit, a request to lease the real estate unit, or some other query, statement, etc., as described above.

At block 420, method 400 generates a token matrix representing a portion of the message 140. In one embodiment, message classification engine 111 performs a number of processing operations on the message 140 to extract a number of features for input into machine learning models 114. For example, as a first step in a multilayer perceptron used by a Calibration Neural Network (CANN) model, the message classification engine 111 can encode the message 140 as a sequence of words (e.g., datasets), and map a unique identifier to each word or sequence of words. This vector of unique identifiers allows for an English sentence to be transformed into a matrix for easier manipulation. Each row of the matrix can correspond to one token (e.g., a word). Each column of the matrix can represent the next character, identified by a unique numeric code. By this construction, each row of the matrix is a vector that represents a word. Trained machine learning modules 114 can use the token matrix representing a portion of the message to classify the message.

At block 430, method 400 provides the token matrix as an input to one or more of trained machine learning models 114. In one embodiment, the set of machine learning models 114 may be composed of a single level of linear or non-linear operations, such as an SVM or deep network (i.e., a machine learning model that is composed of multiple levels of non-linear operations), such as a convolutional neural network (CNN). In one embodiment, the convolutional neural network is trained using a training data set formed from examples of messages pertaining to leasing real estate units as a training input and one or more categories that correctly correspond to the messages as a target output. The training may result in an optimal topology of the network.

In operation, the leasing AI platform assigns a probability to each classification of the input message based on the result of the one or more machine learning models 114. Originally invented for computer vision, CNN models are effective for natural language processing (NLP) including for semantic parsing, search query retrieval and sentence modeling. In some embodiments, the training data is fed to a CNN over multiple training epochs to refine the predictive model for each classification. It should be understood that this is just one example of a predictive model that may be used in conjunction with the leasing AI platform, as other types of models may be used to achieve the benefits of the techniques disclosed herein. In this example, the CNN is a variant of neural network. A neural network is a mathematical construct that models a network of layers with convolving filters applied to local features. A feature is an individually measurable property or characteristic that is usually numeric, but structural features such as strings and graphs may be used in syntactic pattern recognition.

In some embodiments, the CNN model used in the leasing AI platform is a multilayer perceptron, with each layer of the neural network taking input from the layers below it. After generating the token matrix as described above, message classification engine 111 forms a convolution layer, sampling the matrix using a "moving window" function to extract regions of maximum signal. This results in local connections where each region of the input message is connected to a neuron in the output. The CNN model is formed of many successive such layers of convolution and pooling. Each layer applies different filters and combines their results. During the convolution layer, the CNN model samples inputs to link regions to possible outputs. During the pooling layer, a CNN subsamples previous inputs to lower its complexity.

At block 440, method 400 obtains an output of the trained machine learning model. The output may include an indication of a first category associated with the message 140 (or the portion of the message). In one embodiment, the output of the trained machine learning model further comprises an indication that the first category is a preferred category from a plurality of possible categories or a confidence value associated with the first category. If it is desired to sort one or more possible categories by quality, then the output layer can have several neurons (e.g., one for possible category). The output from each neuron can be a number that characterizes the assessment of quality that the message under consideration is related to a certain category. If simply a confidence that the message belongs to a particular category is desired (i.e., yes or no), the output layer can include one neuron, which gives a number indicating a confidence that the message corresponds to the category. For different messages, the topology can vary slightly depending on the quantity and quality of the data available for training.

Figure 5:
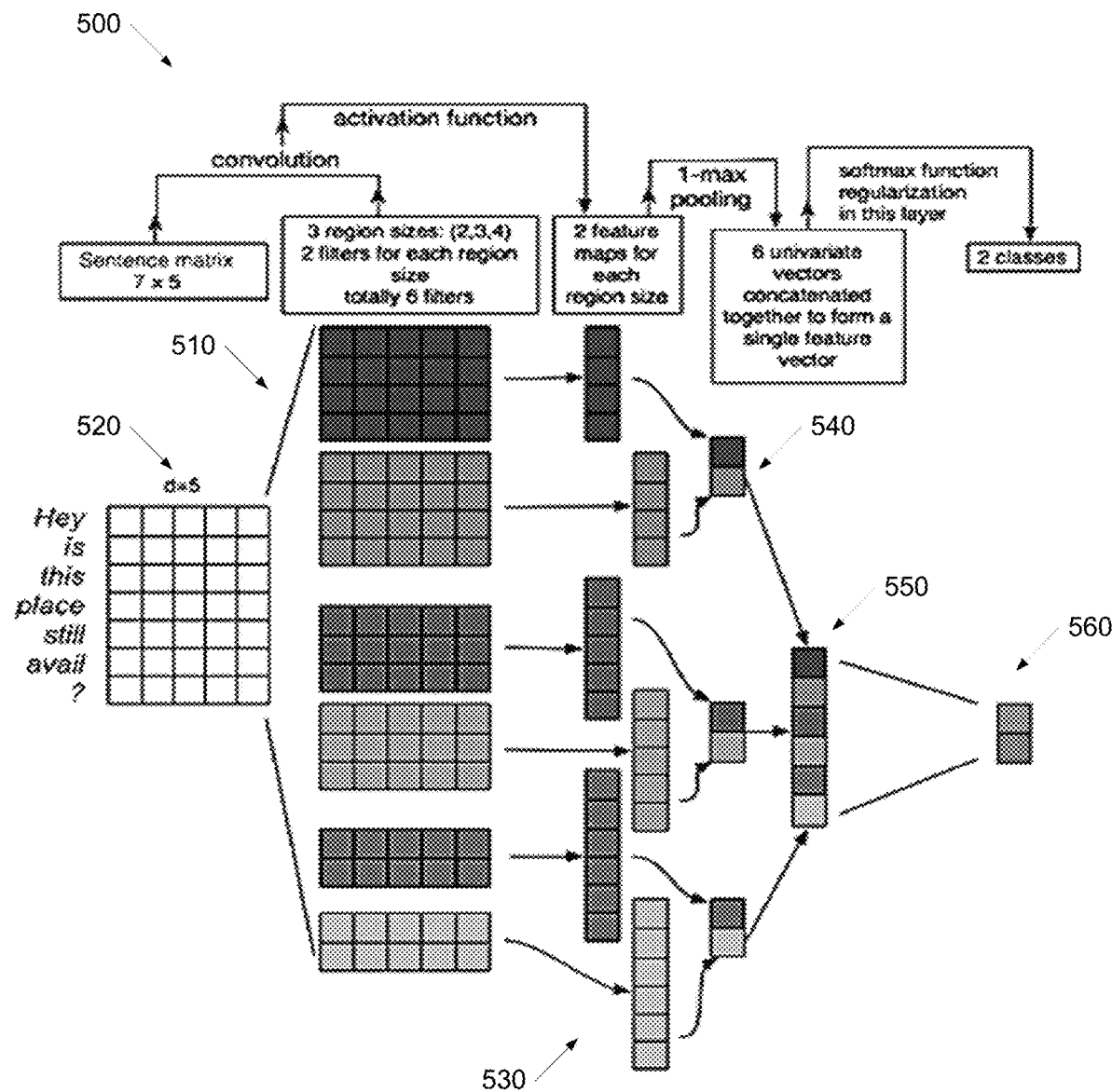
FIG. 5 illustrates a convolutional neural network architecture for message classification, in accordance with one or more aspects of the present disclosure.

FIG. 5 illustrates a convolutional neural network architecture for message classification, according to an embodiment. In one embodiment, the architecture 500 includes three filter region 510 sizes: two, three and four. Each of these filter regions 510 includes two filters. In one embodiment, each filter performs convolution on the sentence matrix 520 and generates (variable-length) feature maps 530. Then message classification engine 111 performs 1-max pooling over each feature map 530 (i.e., records the largest number 540 from each feature map 530). Thus, a univariate feature vector 540 is generated from all six maps 530. In one embodiment, six features (i.e., one feature from each feature map 530) are concatenated to form the feature vector 550 for the penultimate layer. The final layer then receives this feature vector 550 as input and uses it to classify the sentence 560.

Referring again to FIG. 4, at block 450, method 400 identifies one or more actions associated with the first category, the actions pertaining to leasing the real estate unit, and at block 460, automatically executes the one or more actions without human involvement in response to receiving the message. In one embodiment, the leasing AI platform maps each message classification determined by message classification engine 111 into an action or sequence of actions to be performed by action module 112. For example, for a message (e.g., "hi, is this place available?") classified as "ASK_FOR_SHOW" by message classification engine 111 action module 112 may generate a response with a "SEND_OFFER_SHOW" message (e.g., "Could you come Mon., July 16 at 2:00 pm?"). This mapping is deterministic and flexible. Over time, Operators and administrators may expand the set of actions the platform may take in response to a message classification. In addition to responding to incoming messages automatically, action module 112 may also initiate other actions that can be performed. Examples of non-message actions are editing property information (e.g., hours, policies, staff), updating a calendar invitation, archiving a conversation, adding a tag to a message (e.g. "showing feedback", "complaint for escalation"), adding prospects to showings as "ACCEPTED," or other actions.

In addition, action module 112 tracks the state of every prospect that interacts with the leasing AI system, and assigns a corresponding state. The state may be updated over time, such as from OFFERED to ACCEPTED to CONFIRMED The platform provides an on-demand data export, along with counts of the performance for each of prospects, showings, occupancy, agents, etc. Managers may ingest this data with spreadsheet programs to build their own reports. The platform also automatically exports this data back into several types of third-party property management software. As a final step, the leasing AI platform shows this data on the private dashboard, which graphically depicts the conversion rate of the leasing operation. The platform then reports outcomes in three ways: (1) as machine-readable data exports, (2) as the GUI reports native to a third-party property management software, and (3) in a dashboard user interface on a webpage.

In one embodiment, identifying the one or more actions associated with the first category is based on integration with at least one of a calendar program, a property management platform, or a database of applicable legal requirements. If the message 140 includes a request, rather than just blindly providing a response to the request, action module 112 may first consult one or more external sources to ensure that the response is accurate and appropriate. For example, if the message 140 includes a request to schedule a showing of the real estate unit, rather than simply replying with an invitation for any random time, action module 112 may first consult a calendar program running on computing device 110 or on some other device accessible via network 140. In one embodiment, action module 112 may identify a time period when the management office of the property is open, when an agent at the property is available to perform the showing for the prospect, and optionally based on other considerations, such as whether other prospects are coming for a showing at the same time, etc.

In another example, if the message 140 includes a request asking whether a particular type (e.g., floorplan, model, size, etc.) of real estate unit is available at a given property, rather than simply replying with an indication of whether such a unit exists, action module 112 may first consult a property management platform running on computing device 110 or on some other device accessible via network 140. In one embodiment, action module 112 may identify whether there is current vacancy in the unit of the requested type, whether there will be vacancy in the future, whether a similar type of unit is currently available, etc. in order to provide a more appropriate response.

In another example, if the message 140 includes a request asking about the type of people that live at given property, rather than simply replying with an answer related to the resident demographics, action module 112 may first consult a database of applicable legal requirements on computing device 110 or on some other device accessible via network 140. In certain locations, there may be relevant laws, rules, regulations, guidelines, requirements, etc. that restrict the type of information that can be provided to prospects. Thus, in one embodiment, even though the requested information may be available, action module 112 may first determine whether it is permissible to provide such information and may tailor the response appropriately in view of the applicable legal requirements.

In another example, action module 112 may consult a database of contractual terms and/or requirements on computing device 110 or on some other device accessible via network 140. For example, if the message 140 includes a request about a particular unit or type of unit that is unavailable at the requested property, the leasing AI platform may generate one or more recommendations for similar units or types of units at the same property or at other properties (a process referred to herein as "cross-selling"). In some instances, the contractual terms and/or requirements may specify certain properties for which cross-selling is permissible and/or other properties for which cross-selling is prohibited. Thus, even if a relevant unit is available at a nearby property, action module 112 may not recommend that unit to the prospect if the contractual terms and/or requirements prohibit such a recommendation.

Figure 6:
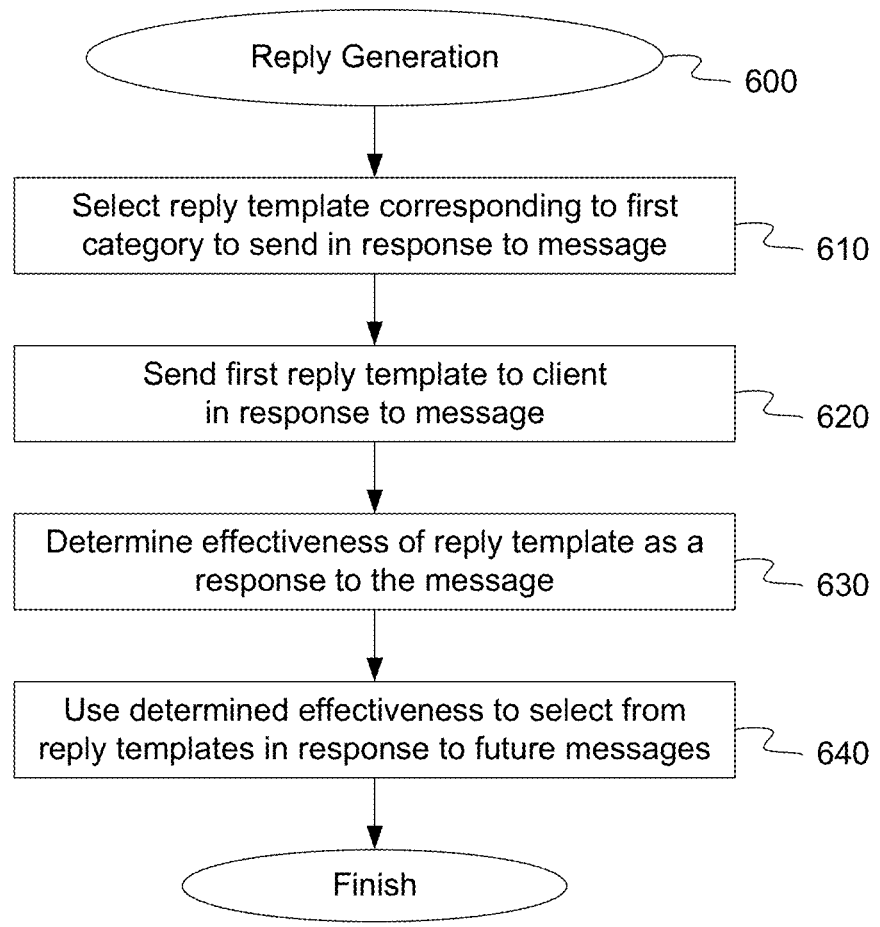
FIG. 6 is a flow diagram illustrating a reply generation method, in accordance with one or more aspects of the present disclosure.

FIG. 6 is a flow diagram illustrating a reply generation method, in accordance with one or more aspects of the present disclosure. The method 600 may be performed by processing logic that comprises hardware (e.g., circuitry, dedicated logic, programmable logic, microcode, etc.), software (e.g., instructions run on a processor to perform hardware simulation), firmware, or a combination thereof. In one embodiment, method 400 may be performed by computing device 110 including message classification engine 111 and action module 112, as shown in FIG. 1.

Referring to FIG. 6, at block 610, method 600 selects a first reply template of a plurality of reply templates corresponding to the first category to send in response to the message 140. In one embodiment, action module 112 maintains a plurality of reply templates, such as in repository 120. Each of the reply templates may be associated with the determined category of the message 140, such that they would constitute an appropriate response to any question or statement contained in the message 140. Each of the reply templates, however, may be formatted differently, may express the requested information differently, may include different information in response to a request, or may otherwise include one or more differences from each other. In one embodiment, action module 112 randomly (or pseudo-randomly) selects one of the available reply templates to send in response to a given message 140, and at block 620, method 600 sends the first reply template to the client device 160 in response to the message 140. Over time, as a number of messages are received, each of the reply templates may be used to send responses to those messages approximately the same number of times.

At block 630, method 600 determines an effectiveness of the first reply template as a response to the message. In one embodiment, action module 112 tracks which reply template was sent and measures a level of engagement with that reply template. For example, action module 112 can track whether another message was received in response to the reply template, whether that message included a clarifying question from the prospect, whether the prospect ultimately decided to lease the real estate unit, or some other conversion metric. As these determinations are made over time for each of the reply templates, action module 112 can determine whether certain reply templates are more effective as a response to prospect messages.

At block 640, method 600 uses the determined effectiveness to select from the plurality of reply templates in response to future messages. For example, if a given reply template results in a higher level of conversion from the prospects to which it was sent that other reply templates, action module 112 may select that reply template to use for a subsequently received message. In one embodiment, action module 112 continues to monitor the effectiveness of the reply templates over time, such that if the effectiveness changes, a different reply template may become preferred in the future.

Figure 7A:
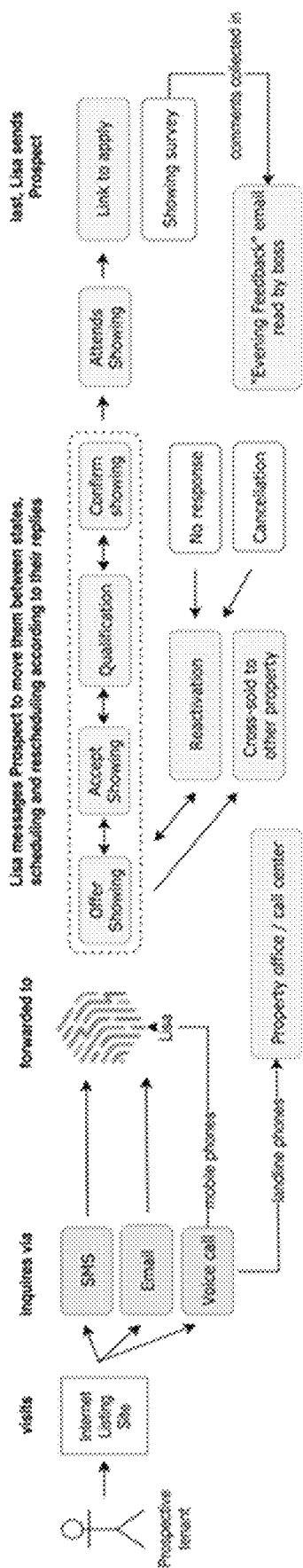
FIGS. 7A-7D illustrate several example uses cases of the leasing AI platform described herein, in accordance with one or more aspects of the present disclosure.
Figure 7B:
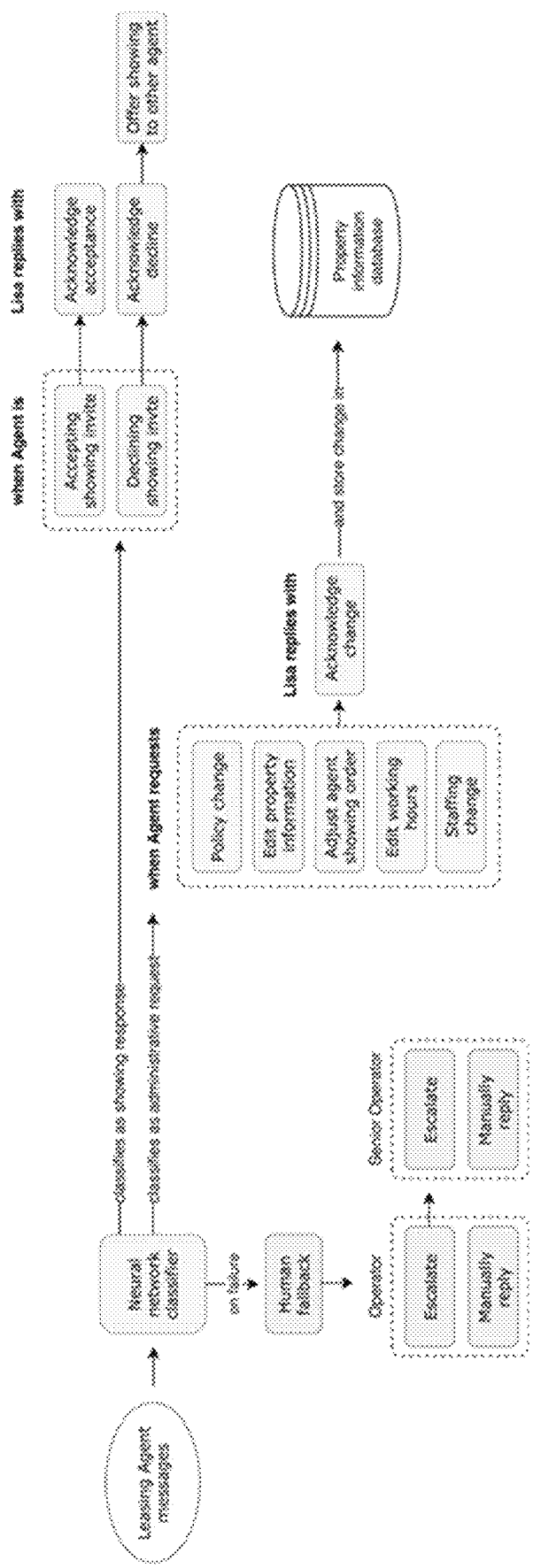
Figure 7C:
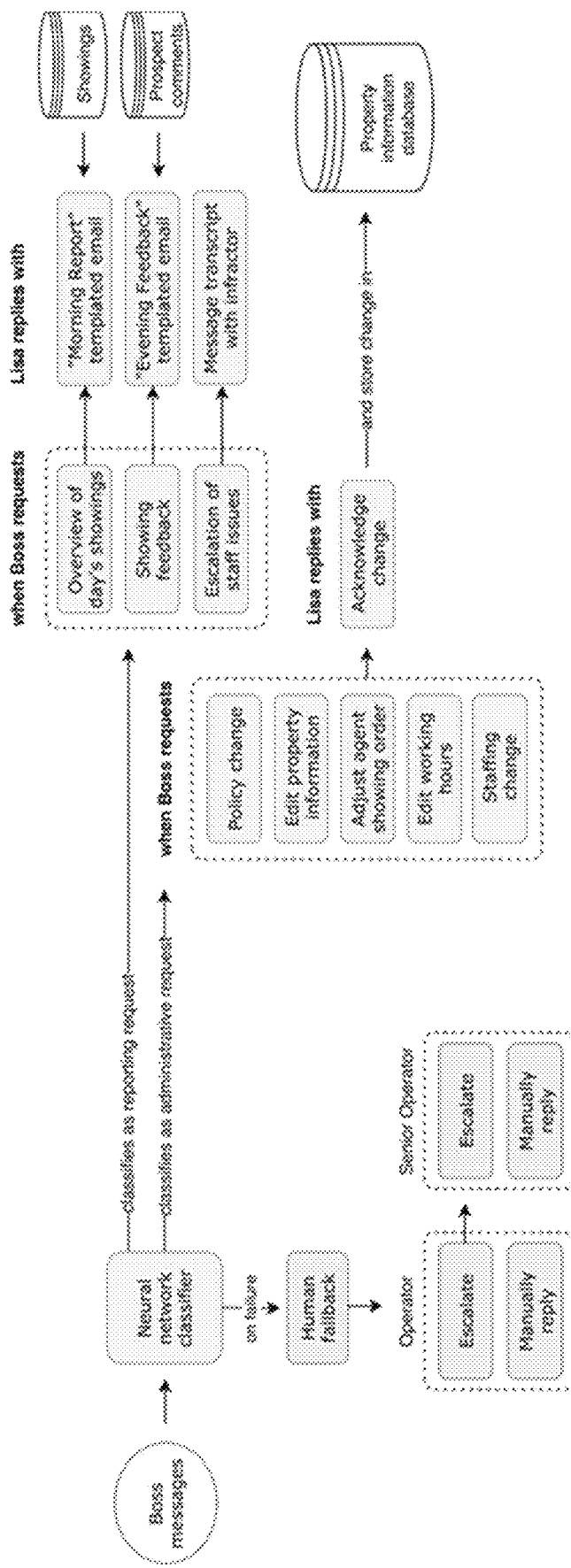
Figure 7D:
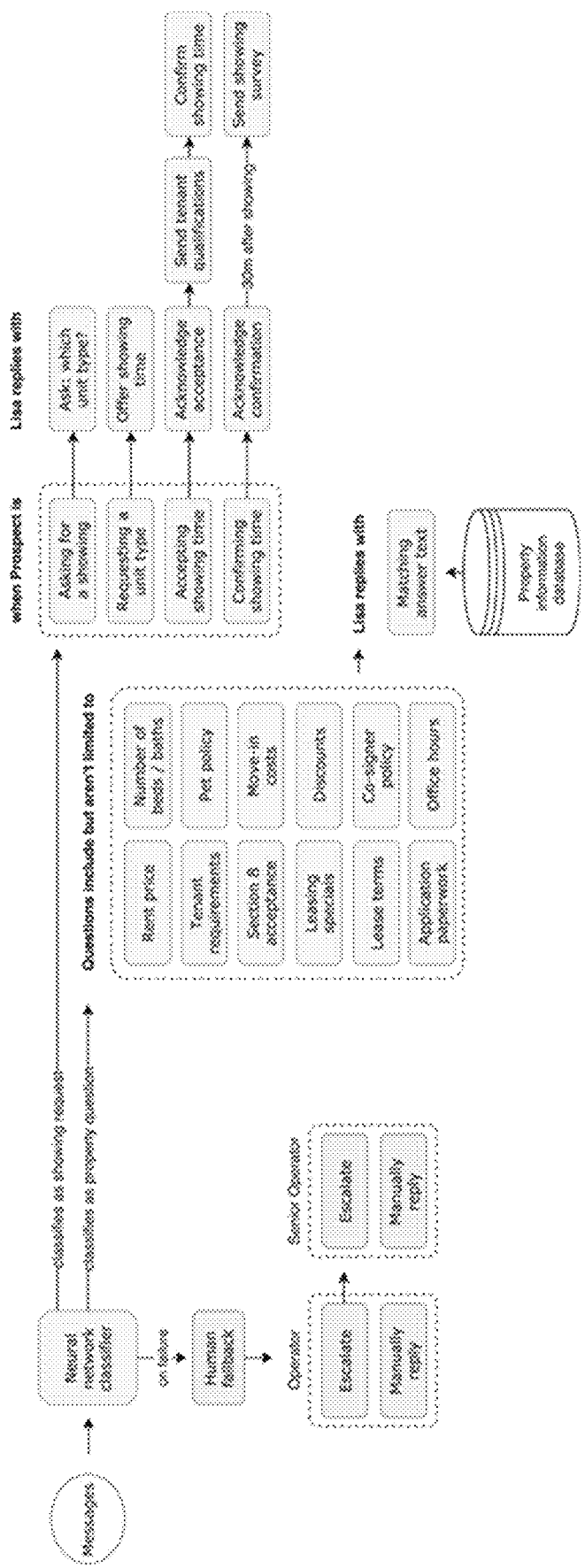

FIGS. 7A-7D illustrate several example uses cases of the leasing AI platform described herein, in accordance with one or more aspects of the present disclosure. FIG. 7A depicts an example process flow as a prospect moves between states when conversing with the leasing AI platform (e.g., to reschedule appointments and confirm their showing of a real estate unit for lease). FIG. 7B depicts an example process flow of possible agent message requests that can be sent to the leasing AI platform, where the leasing AI platform responds to their requests based on the classification of their request. FIG. 7C depicts an example process flow of possible messages sent to platform (e.g., from a manager) where the platform responds to the requests based on the classification of the request. FIG. 7D depicts an example process flow of prospects conversing with the leasing AI platform, where the platform answers the questions throughout the process, but may also resort to a human fallback.

The leasing AI platform, as described herein, can be beneficial to a number of different people in relation to the leasing of a real estate unit, including an operator, manager, prospect, agent, or other individual. For example, an operator can be an individual who doesn't work directly for the property manager, but can be a contractor who works with the leasing AI platform as they desire or on a limited schedule. The operator can access the leasing AI platform, review messages received by the system, correct classifications, manually categorize incoming messages as needed, and handle exceptional circumstances (e.g., by manually responding to messages that cannot be accurately categorized). Meanwhile a property manager can increase the number of properties managed while reducing the number of agents required to do so because the leasing AI platform can handle most of the administrative activities that previously required a larger team of agents. For example, the leasing AI platform can manage incoming messages and respond as needed, schedule showings, qualify prospects, etc. The agent who may have previously received dozens or hundreds of messages every day, but was only able to reply to a handful, now has sufficient time to perform activities that require human action. The agent need only accept calendar invites received from the leasing AI platform and meet prospects when they arrive.

From the perspective of a prospect, the leasing AI platform also offers a number of advantages. In response to a request for information, the leasing AI platform can promptly reply with relevant information, answer questions, schedule an appointment, and send a reminder on the day of the appointment. Afterward, the leasing AI platform can send an application link for the apartment and determine whether the prospect qualifies. While these are only some of the benefits of the leasing AI platform, other advantages are also possible. For example, in one embodiment, there is no dedicated website or user interface, thereby allowing managers, agents, and prospects to all communicate with the leasing AI platform using their existing email or SMS channels. As a result, these users do not have to learn a new technology or familiarize themselves with a new system. Since the leasing AI platform does not include its own separate interface, these users can communicate with the leasing AI platform the same way they communicate with each other already. For example, the team members (e.g., agents, managers, etc.) can send email or text messages to an email address or phone number associated with the leasing AI platform. Similarly, the team members can receive communications (e.g., email messages, text messages, calendar invites, tasks, etc.) from the leasing AI platform via their existing communication channels.

In addition, the leasing AI platform has a custom-trained ability to categorize and respond to a number of different questions that real-estate prospects ask (e.g. "what's the rent, can I bring a dog, is there a yard?"). In one embodiment, the leasing AI platform adds an artificial delay of (e.g., 120 seconds) to every response, which is set to mimic a human agent's reply time under working conditions for a more natural, conversational experience. The leasing AI platform can pull data from existing property management software, so there's no lengthy setup for staff. The leasing AI platform chats with existing staff by email/text message, using the same tools such staff uses. In addition, the leasing AI platform can train agents on how to use the platform by messaging agents and teaching them in a text-based series of questions and answers, as well as automatically build its knowledge of a property's leasing policies by contacting property executives and managers (e.g., via email or SMS) to confirm property details.

Operators through a proprietary website may effectively "drive" the leasing AI platform when confidence on the classification of messages is low. In this regard, the interface is a source of training data. The more the Operators categorize and reply to messages, the greater training dataset is created. Thereupon, the leasing AI platform learns from the Operators and the more they drive it, the less the platform needs them.

The leasing AI platform can be trained to not only respond with messages, but also take administrative actions. In some embodiments, an interface associated with the leasing AI platform facilitates a smooth and efficient bootstrapping of new features. For example, the leasing AI platform uses an "automation pipeline" for developing features. As an example, to build a feature that answers questions about pet policy, the feature is run through the "automation pipeline":
  a. Operator manually writes appropriate text.
  b. Operator can choose a template from a list.
  c. Operator is suggested a template from a list, based on context.
  d. The leasing AI platform chooses the template from a list—with oversight.
  e. The leasing AI platform chooses the template from a list—without oversight.

Figure 8:
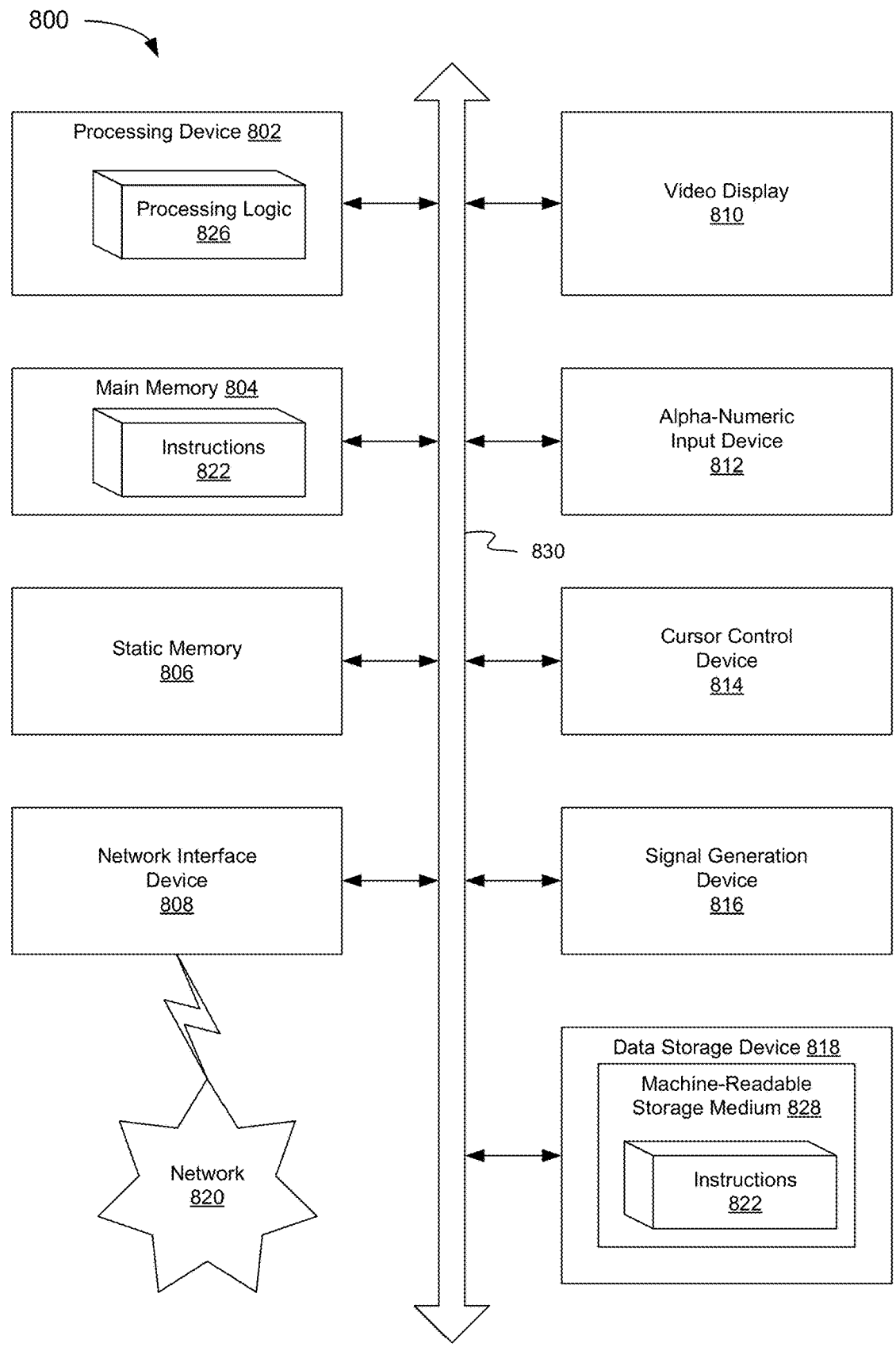
FIG. 8 depicts an example computer system which can perform any one or more of the methods described herein, in accordance with one or more aspects of the present disclosure.

FIG. 8 depicts an example computer system 800 which can perform any one or more of the methods described herein, in accordance with one or more aspects of the present disclosure. In one example, computer system 800 may correspond to a computing device capable of executing message classification engine 111 of FIG. 1. In another example, computer system 800 may correspond to a computing device capable of executing training engine 151 of FIG. 1. The computer system 800 may be connected (e.g., networked) to other computer systems in a LAN, an intranet, an extranet, or the Internet. The computer system 800 may operate in the capacity of a server in a client-server network environment. The computer system 800 may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker). In one illustrative example, the video display unit 810, the alphanumeric input device 812, and the cursor control device 814 may be combined into a single component or device (e.g., an LCD touch screen).

The data storage device 818 may include a computer-readable medium 828 on which the instructions 822 (e.g., implementing message classification engine 111 or training engine 151) embodying any one or more of the methodologies or functions described herein is stored. The instructions 822 may also reside, completely or at least partially, within the main memory 804 and/or within the processing device 802 during execution thereof by the computer system 800, the main memory 804 and the processing device 802 also constituting computer-readable media. The instructions 822 may further be transmitted or received over a network via the network interface device 808.

While the computer-readable storage medium 828 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving a message pertaining to a real estate management activity, the message comprising a request;
   generating, by a processing device, a token matrix representing at least a portion of the message including the request;
   providing the token matrix as an input to a trained machine learning model;
   obtaining an output of the trained machine learning model, wherein the output comprises an indication of a first category associated with the at least the portion of the message including the request;
   identifying one or more actions associated with the first category, the actions comprising a response to the request and pertaining to the real estate management activity; and
   automatically executing the one or more actions without human involvement in response to the request in the received message.

2. The method of claim 1, wherein receiving the message comprises receiving at least one of an email message or a text message from a client device.

3. The method of claim 1, wherein the request in the message comprises at least one of a request for information about a real estate unit, a request to schedule a time to view the real estate unit, a request to lease the real estate unit, or a request for maintenance associated with the real estate unit.

4. The method of claim 1, wherein the token matrix comprises a plurality of rows and columns, wherein each row of the plurality of rows comprises a vector representing a word in the message, and wherein each column of the plurality of columns represents a character in the word.

5. The method of claim 1, wherein the trained machine learning model comprises a convolutional neural network.

6. The method of claim 1, wherein the output of the trained machine learning model further comprises an indication that the first category is a preferred category from a plurality of possible categories or a confidence value associated with the first category.

7. The method of claim 1, wherein the trained machine learning model is trained using a training data set, the training data set comprising examples of messages pertaining to real estate management activities as a training input and one or more categories that correctly correspond to the messages as a target output.

8. The method of claim 1, wherein the one or more actions comprise at least one of sending a response to the message including information about the real estate activity, scheduling a time for a prospect to view a real estate unit, determining whether the prospect is qualified to lease the real estate unit, or performing maintenance associated with the real estate unit.

9. The method of claim 1, wherein automatically executing the one or more actions comprises:
selecting a first reply template of a plurality of reply templates corresponding to the first category to send in response to the message;
determining an effectiveness of the first reply template as a response to the message; and
using the determined effectiveness to select from the plurality of reply templates in response to future messages.

10. The method of claim 1, further comprising:
determining that a confidence value associated with the first category fails to satisfy a threshold;
requesting a manual classification of the message from an operator;
receiving an indication of a second category assigned by the operator; and
providing the message and the indication of the second category back to the trained machine learning model as training data.

11. The method of claim 1, wherein identifying the one or more actions associated with the first category is based on integration with at least one of calendar program, a property management platform, or a database of applicable legal requirements.

12. A system comprising:
a memory device storing instructions;
a processing device coupled to the memory device, the processing device to execute the instructions to:
receive a message pertaining to a real estate management activity, the message comprising a request;
generate a token matrix representing at least a portion of the message including the request;
provide the token matrix as an input to a trained machine learning model;
obtain an output of the trained machine learning model, wherein the output comprises an indication of a first category associated with the at least the portion of the message including the request;
identify one or more actions associated with the first category, the actions comprising a response to the request and pertaining to the real estate management activity; and
automatically execute the one or more actions without human involvement in response to the request in the received message.

13. The system of claim 12, wherein the message comprises at least one of an email message or a text message received from a client device, wherein the request in the message comprises at least one of a request for information about a real estate unit, a request to schedule a time to view the real estate unit, a request to lease the real estate unit, or a request for maintenance associated with the real estate unit.

14. The system of claim 12, wherein the trained machine learning model comprises a convolutional neural network, wherein the token matrix comprises a plurality of rows and columns, wherein each row of the plurality of rows comprises a vector representing a word in the message, and wherein each column of the plurality of columns represents a character in the word.

15. The system of claim 12, wherein the output of the trained machine learning model further comprises an indication that the first category is a preferred category from a plurality of possible categories or a confidence value associated with the first category.

16. The system of claim 12, wherein the trained machine learning model is trained using a training data set, the training data set comprising examples of messages pertaining to real estate management activities as a training input and one or more categories that correctly correspond to the messages as a target output.

17. A non-transitory computer-readable storage medium storing instructions that, when executed by a processing device, cause the processing device to:
receive a message pertaining to real estate management activity, the message comprising a request;
generate a token matrix representing at least a portion of the message including the request;
provide the token matrix as an input to a trained machine learning model;
obtain an output of the trained machine learning model, wherein the output comprises an indication of a first category associated with the at least the portion of the message including the request;
identify one or more actions associated with the first category, the actions comprising a response to the request and pertaining to the real estate management activity; and
automatically execute the one or more actions without human involvement in response to the request in the received message.

18. The non-transitory computer-readable storage medium of claim 17, wherein the message comprises at least one of an email message or a text message received from a client device, wherein the request in the message comprises at least one of a request for information about a real estate unit, a request to schedule a time to view the real estate unit, a request to lease the real estate unit, or a request for maintenance associated with the real estate unit.

19. The non-transitory computer-readable storage medium of claim 17, wherein the trained machine learning model comprises a convolutional neural network, wherein the token matrix comprises a plurality of rows and columns, wherein each row of the plurality of rows comprises a vector representing a word in the message, and wherein each column of the plurality of columns represents a character in the word.

20. The non-transitory computer-readable storage medium of claim 17, wherein the trained machine learning model is trained using a training data set, the training data set comprising examples of messages pertaining to real estate management activities as a training input and one or more categories that correctly correspond to the messages as a target output.

* * * * *